Patented June 29, 1926.

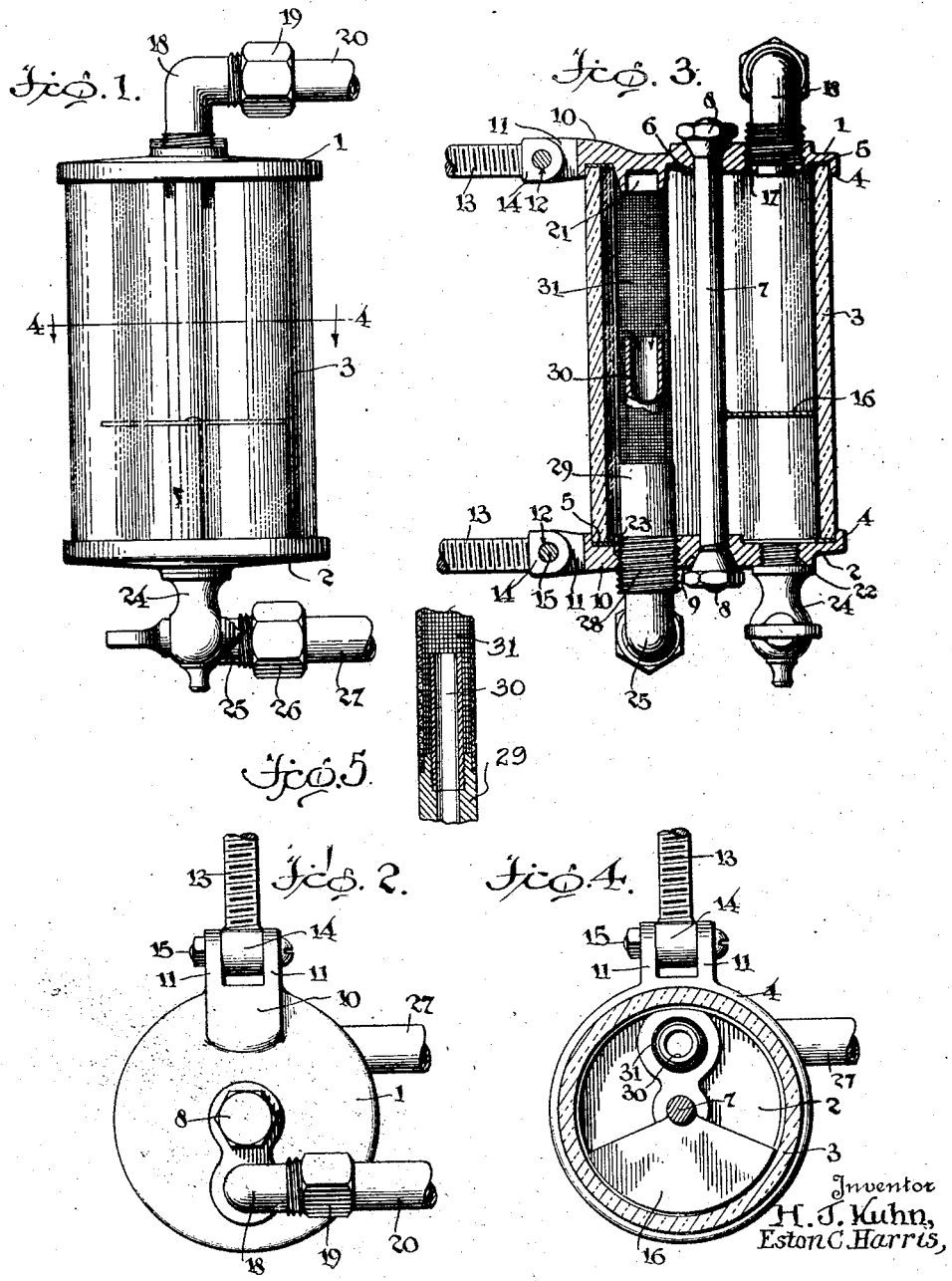

1,590,950

UNITED STATES PATENT OFFICE.

HARRY J. KUHN, OF MIDDLETOWN, AND ESTON C. HARRIS, OF MONTICELLO, NEW YORK.

FILTER DEVICE.

Application filed August 21, 1924. Serial No. 733,383.

This invention relates to filter devices particularly adapted for use in connection with internal combustion engines, to filter the fuel therefor before the same is fed through the carburetor to the engine.

The primary object of this invention is the provision, in a manner as hereinafter set forth, of a fuel filter adapted to be connected in the fuel line, which will act to remove from the fuel dirt and water and other foreign matter, before the same is fed to the engine thereby producing better and more complete combustion of the fuel in the engine by which greater power will be obtained.

A still further object of this invention is the provision, in a manner as hereinafter set forth, of a fuel straining device so constructed that the flow of fuel to the engine will be under observation at all times by the one controlling the engine thereby indicating to the operator any irregularity in the flow of fuel which would injure the work and power of the engine.

Still another object of this invention is the provision, in a manner as hereinafter set forth, of a sight fuel strainer having means for maintaining a quantity of fuel at a certain height within the strainer body so that water and sediment and other foreign matter will settle to the bottom of the strainer where it is drawn off while the clean and strained fuel only will be allowed to pass from the strainer to the engine.

Yet another object of this invention is the provision in a manner as hereinafter set forth, of a sight fuel strainer of an improved construction setting up means whereby the strainer may be secured in position within sight of the operator of the machine, in a new, more efficient and better way.

A final object of this invention is the provision, in a manner as hereinafter set forth, of a sight feed fuel strainer of improved design, of neat appearance, having few movable parts, strong, durable, efficient in action, inexpensive to manufacture and easily set up.

The invention will be best understood from a consideration of the following detailed description taken in connection with the accompanying drawings forming a part of this specification, with the understanding that the invention is not confined to any strict conformity with the showing of the drawings but may be changed and modified so long as such changes and modifications mark no material departure from the salient features of the invention as expressed in the appended claims.

In the drawings:

Figure 1 shows a side elevation of the device embodying this invention.

Figure 2 is a top plan view of the same.

Figure 3 is a central longitudinal sectional view of the device.

Figure 4 is a transverse section taken upon the line 4—4 of Figure 1.

Figure 5 is a vertical section through an element within the filter device, showing details of construction.

Referring now to the drawings in detail wherein like numerals of reference indicate corresponding parts throughout the several views, the device embodying this invention comprises top and bottom plates, each indicated as a whole by the numerals 1 and 2 respectively, and the intermediate connecting cylindrical transparent body portion 3, which is here shown and is preferably constructed of heavy glass.

Each of the plates 1 and 2 is formed to provide the peripheral flange 4 which, as shown, is of slightly greater diameter than the cylinder 3 and in which the cylinder ends are positioned. Between the cylinder ends and the inner face of each of the plates is placed a ring washer 5.

Each of the plates 1 and 2 has formed therethrough a concentric aperture 6 through which there extends the ends of the tie rod 7. Each end of this tie rod 7 is threaded to receive thereon the nut 8, which nuts are cone-shaped upon one side and fit into the countersunk portion 9 of the plate.

Each of the plates 1 and 2 has formed thereon a boss 10 which extends beyond the edge of the plate and is bifurcated as shown to provide the spaced ears 11 through each of which an aperture 12 is formed.

A supporting screw 13 is associated with each of the plates 1 and 2, and each of these screws has at its inner end the enlarged cylindrical head 14 which is positioned between the furcations 11, and each of these heads has an axial bore therethrough which is aligned with the apertures 12 in the furcations to receive the securing and pivot screw 15, by means of which the parts are secured together. When the device is set up and the plates are superposed and retained at each end of the cylinder 3 by means of the tie rod 7 as indicated in Figure 3, the furcations 11 of the bosses 10 are in alignment so that the extending screws 13 may be extended through apertures in a supporting member to receive retaining nuts (not shown) designed to hold the screws and the device in position.

At a point intermediate the center and lower end of the tie rod 7, there is secured to the tie rod a segmental plate 16, this plate as shown in Figure 4 extends from the tie rod 7 to a point adjacent the inner face of the cylinder 3.

Directly above this plate 16, which serves as a deflector or baffle plate in a manner to be hereinafter described, the plate 1 has formed therethrough the threaded aperture 17. Into this aperture 17 there is threaded one arm of an elbow coupling 18, the other arm of which has connected thereto, by means of the coupling nut 19, a fuel supply tube 20 leading from the fuel tank of the engine to the strainer.

Formed upon the inner face of the plate 1 at a point diametrically opposite the point at which the aperture 17 is formed, is a centering lug or nipple 21. In the plate 2 there is formed a pair of threaded apertures 22 and 23 respectively, the aperture 22 being adapted to receive the threaded end of the drain cock 24 by means of which the body of the device may be drained and cleaned. This aperture and the drain cock therein is positioned directly beneath the deflector or baffle plate 16. The other aperture 23 is located directly beneath the nipple 21, and is adapted to threadably receive therethrough the lower portion of the fuel outlet element of the device. This fuel outlet element comprises an elbow 25 having one arm provided with the coupling nut 26 to which the fuel feed line to the carburetor of the engine is connected as at 27. The other arm of the connecting elbow is of substantial length and is provided at its central portion with the threads 28 which engage in the threaded aperture 23, and the inner end extends into the cylinder as at 29. The inner end 29 of the elbow 25 has a reduced portion 30 extending therefrom, the open end of which terminates in the central portion of the cylinder 3 at one side thereof and constitutes an overflow.

Secured to the end of the portion 29 and surrounding the reduced overflow pipe 30 and extending to and surrounding the nipple 21 is a copper gauze cylinder 31 which acts as a strainer for the fuel which enters the cylinder 3 and leaves by way of the overflow pipe 30 and the coupling elbow 25. This copper gauze cylinder 31 is of the same diameter as the portion 29, and is only frictionally engaged at its upper end over the nipple 21 so that should the same need cleaning or repairing, it can be entirely removed together with the overflow pipe 30, by unscrewing the coupling elbow 25 whereby the portion 29 and the copper cylinder 31 will pass easily through the aperture 23. In this manner this portion of the structure can be removed and cleaned without taking down any other part of the strainer and without any trouble other than the disconnecting of the fuel line 27 from the coupling 25.

When the strainer embodying this invention is set up in the gasoline line of a machine between the fuel tank and the carburetor, the fuel will enter through the coupling 18 and fall upon the baffle plate 16 and fill the cylinder to the top of the overflow pipe 30, through which overflow pipe the carburetor will draw the fuel to pass into the engine. When the device is cleaned and perfectly operating, the fuel will always be upon a level with the top of the overflow pipe 30 and all dirt, water or other foreign matter entering the strainer is settled to the bottom thereof about the portion 29. The baffle plate 16 prevents the disturbance of any sediment in the bottom of the strainer, by the fuel entering through the coupling 18. Should the strainer cylinder 31 become clogged about the top of the overflow pipe 30, this condition will be indicated by the rise of the fuel in the cylinder, whereupon the gauze cylinder 31 can be removed at the first opportunity and thoroughly cleaned. The drain cock 24 can be operated to remove water and sediment from the strainer when the same has reached a height in the strainer which would necessitate its removal. This sediment and water should be removed before the same rises above the upper end of the portion 29 to which the gauze cylinder 31 is connected.

From the foregoing description it may be seen that a very efficient and useful fuel strainer is provided by means of which an engine operator can view at all times the flow of fuel to his engine, and by means of which he will be informed immediately of any disturbance or interruption in the flow of fuel through the line. In addition to this, an engine operator, in using this device, is assured at all times that a perfectly clean and sediment free fuel is being fed to his machine and that he is getting the maximum power from his fuel.

Having thus described our invention what we claim is:

1. In a fuel strainer of the character set forth, a top and bottom plate member, a casing arranged between and spacing said plate members, a connecting tie rod between said plates, an outlet tube of uniform diameter threaded intermediate its ends and secured in said lower plate, an overflow pipe of less diameter than said tube fixed at one end to the inner end of said outlet tube, and a foraminous tubular strainer of the diameter of said outlet tube, surrounding said overflow pipe and fixed at one end to said tube and having its other end open and removably secured against the under side of said top plate.

2. In a fuel strainer of the character set forth, a top and bottom plate member, an inlet through said top plate, a casing arranged between and spacing said members, a connecting tie rod between said plates having a removable securing element on each end thereof, an outlet connection in said lower plate, a combined overflow and strainer element within said casing and carried by said connection and removable therewith, and a baffle plate carried by said tie rod beneath said inlet.

In testimony whereof, we affix our signatures hereto.

HARRY J. KUHN.
ESTON C. HARRIS.